United States Patent [19]
Kellas et al.

[11] Patent Number: 5,746,537
[45] Date of Patent: May 5, 1998

[54] CRASH-ENERGY ABSORBING COMPOSITE STRUCTURE AND METHOD OF FABRICATION

[75] Inventors: Sotiris Kellas, Yorktown; Huey D. Carden, Hampton, both of Va.

[73] Assignee: The United States of America as represented by the Administrator of the National Aeronautics and Space Administration, Washington, D.C.

[21] Appl. No.: 624,843

[22] Filed: Mar. 20, 1996

[51] Int. Cl.$^6$ .............................. E01F 13/00; E01F 15/00
[52] U.S. Cl. ............................................ 404/6; 256/13.1
[58] Field of Search ............................ 404/6; 256/13.1; 428/304.4; 442/181, 221

[56] References Cited

U.S. PATENT DOCUMENTS

| | | | |
|---|---|---|---|
| 3,658,612 | 4/1972 | Corzine | 156/93 |
| 3,704,861 | 12/1972 | Glaesener | 256/13.1 |
| 3,876,185 | 4/1975 | Welch | 256/1 |
| 4,007,917 | 2/1977 | Brubaker | 256/13.1 |
| 4,290,585 | 9/1981 | Glaesener | 256/13.1 |
| 4,352,484 | 10/1982 | Gertz et al. | 256/13.1 |
| 4,822,208 | 4/1989 | Ivey | 404/6 |
| 4,909,661 | 3/1990 | Ivey | 404/6 |
| 5,011,326 | 4/1991 | Carney, III | 404/6 |
| 5,054,954 | 10/1991 | Cobb et al. | 404/6 |
| 5,102,723 | 4/1992 | Pepin | 428/223 |
| 5,387,455 | 2/1995 | Horsch | 428/116 |
| 5,403,112 | 4/1995 | Carney, III | 404/6 |

*Primary Examiner*—Tamara L. Graysay
*Assistant Examiner*—Gary S. Hartmann
*Attorney, Agent, or Firm*—Kimberly A. Chasteen

[57] ABSTRACT

A stand-alone, crash-energy absorbing structure and fabrication method are provided. A plurality of adjoining rigid cells are each constructed of resin-cured fiber reinforcement and are arranged in a geometric configuration. The geometric configuration of cells is integrated by means of continuous fibers wrapped thereabout in order to maintain the cells in the geometric configuration. The cured part results in a net shape, stable structure that can function on its own with no additional reinforcement and can withstand combined loading while crushing in a desired direction.

16 Claims, 3 Drawing Sheets

CRASH-ENERGY ABSORBING COMPOSITE STRUCTURE AND METHOD OF FABRICATION

ORIGIN OF THE INVENTION

The invention was jointly made by an employee of the United States Government and a contract employee during the performance of work under NASA Contract NAS1-19000 and is subject to the provisions of Section 305 of the National Aeronautics and Space Act of 1958, as amended, Public Law 85-568 (72 Stat. 435; 42 USC 2457).

BACKGROUND OF THE INVENTION

1. Field of the Invention

This invention relates to energy absorbing composite structures. More specifically, the invention is a crushable structure for use in moving vehicles such as aircraft, automobiles, etc., as well as stationary structures such as highway barriers, shipping containers, etc., and a method of fabricating such a structure.

2. Description of the Related Art

The effective management of crash energy is of interest in a wide variety of applications. For example, the management of crash energy in moving vehicles such as aircraft and automobiles is important from a safety perspective in the event of an accident. The management of crash energy in stationary structures such as shipping containers and highway barriers is important from the perspective of damage control as well as safety. While there are several methods for managing crash energy, there are very few cost effective solutions that can be accomplished without adding unwanted weight. Examples of such solutions that have been used include thin-wall steel tubes in automobiles for managing front and side impacts, and sine wave composite beam webs in military helicopters for managing vertical impacts.

The optimization of steel structures is generally limited by the uniform thickness of the sheet material used in the construction of the energy absorber. Any attempt to introduce thickness variation and/or "tee" or "cross" intersections in the cross-section of a column structure (in order to maximize the specific energy absorption) in a steel or aluminum structure will result in prohibitive fabrication costs and/or weight penalties. Therefore, optimization or structural tailoring of metal energy absorbers is limited by the fabrication processes as well as the isotropic nature of metal materials.

The use of composite sine wave beam web concepts for crash energy management has been demonstrated successfully in helicopter subfloor structures. However, the fabrication of such structures requires the use of an expensive molding tool. The optimization of the sine wave beam web is therefore limited by the molding tool which has a fixed wave length and wave amplitude. Another disadvantage is the sensitivity of this design to fabrication irregularities. Yet, a reduction (or elimination) of fabrication flaws often translates to higher production costs through the fabrication of better quality molding tools and/or rejection of finished parts.

SUMMARY OF THE INVENTION

Accordingly, it is an object of the present invention to provide a structure that is effective in managing crash energy and a method for fabricating the structure.

Another object of the present invention is to provide a crash-energy absorbing structure that is lightweight.

Still another object of the present invention is to provide a crash-energy absorbing structure that makes use of simple, cost-effective fabrication techniques.

Yet another object of the present invention is to provide a crash-energy absorbing structure and fabrication method that can be adapted for a variety of applications.

Other objects and advantages of the present invention will become more obvious hereinafter in the specification and drawings.

In accordance with the present invention, a stand-alone, crash-energy absorbing structure and fabrication method are provided. A plurality of adjoining rigid cells are each constructed of resin-cured fiber reinforcement and are arranged in a geometric configuration. The fiber reinforcement can be in the form of a fabric or braided fibers wrapped about a core that is either left in place or removed from the ultimate cured structure. The geometric configuration of cells is wrapped with more fiber reinforcement (in the form of fabric or braided fibers) in order to integrate the cells in the geometric configuration. In applications where post-crash integrity is necessary, ductile fibers can be used to integrate the cells in the geometric configuration.

BRIEF DESCRIPTION OF THE DRAWINGS

FIG. 1A is a perspective view of a core being wrapped with continuous fiber reinforcement in the form of a fabric in order to form a cell;

FIG. 1B is a perspective view of several cells arranged in a one-dimensional configuration and further showing the containment skin prior to being applied about the arranged cells;

FIG. 1C is a perspective view of the resulting crash-energy absorbing structure showing the variety of forces it can experience when crushed;

DETAILED DESCRIPTION OF THE INVENTION

Figure 1A:
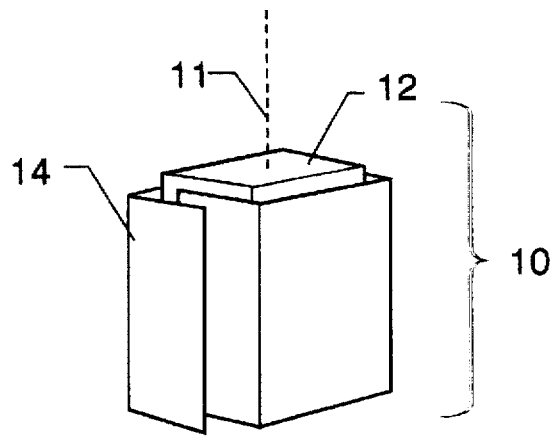
FIGS. 1A–1C depict a typical fabrication sequence for an embodiment of the crash-energy absorbing structure according to the present invention where.

Referring now to the drawings, and more particularly to the sequence of FIGS. 1A–1C, a typical process of fabricating an embodiment of the crash-energy absorbing structure of the present invention will be explained.

However, as will be apparent to one skilled in the art of composites fabrication, details of the method of fabrication can vary without departing from the scope of the present invention. Furthermore, structures other than the one shown could be fabricated as will be discussed later below.

Figure 1B:
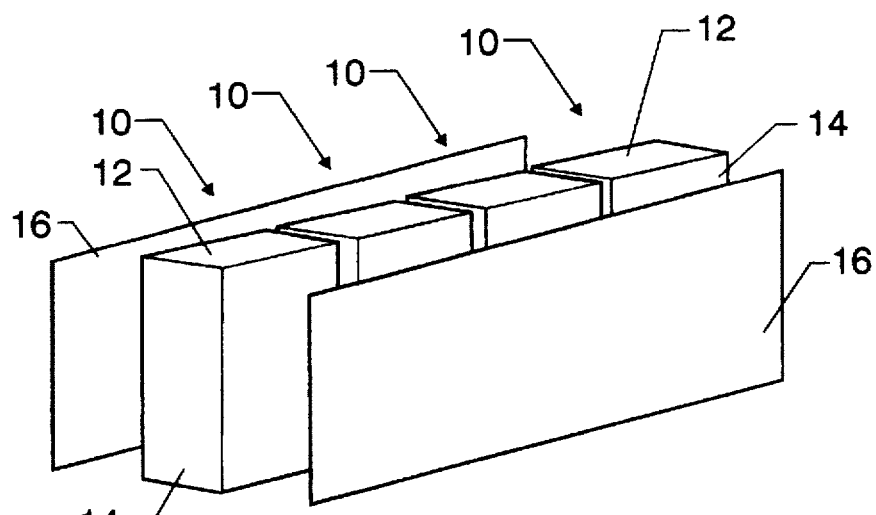
Figure 1C:
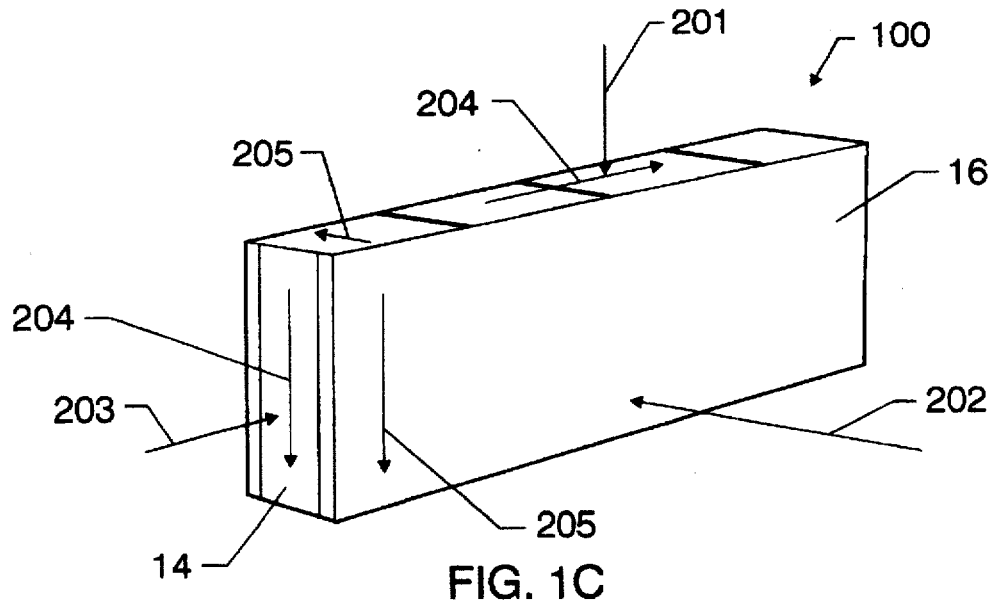

In FIG. 1A, the fabrication process begins with the construction of a single cell 10 that is based on a block or core 12 of a specified shape. Cell 10 has a longitudinal axis represented by dashed line 11. Core 12 is typically made from a lightweight material such as a closed-cell, low-density, rigid structural foam if it is to remain as part of the fabricated structure. Examples of such structural foam include polyvinyl chloride foam, polyurethane foam, polystyrene foam and other syntactic foams. However, if core 12 is to be removed from the ultimate structure, a denser material that is easily shaped, e.g., wood, wax, or any other material that is (or can be treated to be) easily separated from cured composite materials, can be used for core 12.

As shown in FIG. 1A, core 12 is wrapped around the perimeter thereof with a continuous fiber reinforcement in the form of, for example, a woven fabric 14. By way of example, fabric 14 is an inexpensive fabric such as a woven glass fabric that is generally wrapped substantially or wholly about the perimeter of core 12 circumscribing longitudinal axis 11. However, the present invention is not so limited. As will be explained further below, continuous fiber reinforcement of core 12 could take the form of fibers that are woven or braided directly about core 12 using braiding methods well known in the art.

Whether using fabric 14 or braiding fibers directly on core 12, eventually the fibers must be impregnated with a resin material (such as a polymer resin) before curing. It is to be understood that a variety of matrix impregnation methods are well known in the art and that such methods are not part of the present invention. For example, one method involves the wet lay-up of fabric 14 about core 12 and curing thereof to form cell 10. Alternatively, fabric 14 could be tacked in place on core 12 and a resin infusion process, e.g., a standard resin transfer method (RTM), utilized at this point in the fabrication process or once a number of cells 10 are arranged together as will be described below. The use of a closed-cell foam for the core material prevents the absorption of the resin material during the assembly process. Pre-impregnated fabrics and tapes can also be used for the construction of the cells.

A plurality of cells 10, in either their cured or un-cured state, are arranged in a geometric configuration suitable for a particular application such that their respective longitudinal axes are parallel to one another. By way of example, FIG. 1B shows four cells 10 arranged side-by-side in a line as would be the case in beam fabrication. Each cell typically adjoins the next cell to form an area of contact that serves as transverse reinforcement in the ultimate structure as will be explained further below.

Once arranged in their desired geometric configuration, cells 10 are assembled into a unitary structure by means of containment skin(s) 16. Similar to fabric 14, skins 16 are wrapped around the perimeter of the arranged cells 10 with a continuous fiber reinforcement in the form of, for example, a fabric represented as skins 16. Skins 16 are generally wrapped substantially or wholly about the perimeter of the arranged cells 10. However, the present invention is not so limited. The continuous fiber reinforcement provided by skins 16 could also take the form of fibers that are woven or braided directly about the arranged cells 10 using braiding methods well known in the art.

In applications where post-crash integrity of the unitary structure is a requirement, skin 16 is constructed from ductile fibers such as aramid fibers (e.g., KEVLAR® fibers manufactured by E. I. DuPont De Nemours and Company), polyethylene fibers (e.g., SPECTRA® fibers manufactured by Allied Corporation), or combinations thereof. Skin 16 is wrapped about the so arranged cells 10 in sufficient quantity to both hold the arrangement of cells together and to provide the desired degree of post-crash integrity for the structure as will be described further below. By way of non-limiting example, two skins 16 are shown in FIG. 1B. Naturally, a single containment skin could also be used to enclose the arranged cells 10. Note that when post-crash integrity is unimportant, a glass or other inexpensive fabric could be used for skin 16.

Similar to fabric 14, the fibers of containment skin 16 must be impregnated with resin and cured in place over the arranged cells 10. As skin 16 is cured to cells 10, the resin links fabric 14 and skins 16. Note that a single curing step can be used to cure the resin-impregnated fabrics 14 and skins 16. The resulting crash-energy absorbing structure is formed as shown in FIG. 1C where the structure is referenced generally by numeral 100. Adjoining areas between cells 10 cure together to form transverse reinforcements 18 between skins 16. Once again, it is to be understood that a variety of resin impregnation and curing methods are well known in the art and that the choice of a particular method is not critical to the present invention. For example, skins 16 could be impregnated separately from or simultaneously with fabric 14 (or the wrapped fiber reinforcement of the cores 12 if braiding techniques are used). Thus, skins 16 could be impregnated with resin by means of a wet lay-up, the use of pre-impregnated fabrics and tapes, or a resin infusion process. The resulting cured structure 100 can be used as is or is easily cut/shaped slightly to fit a desired application.

The method of fabrication in the present invention provides great flexibility in terms of customizing shape, size, stiffness and strength. With respect to stiffness and strength, note that individual cells can be customized by adjusting the fiber orientation or by providing additional wraps of the continuous reinforcing fabric 14 (or fibers if braiding techniques are used) about the core. Note also that each transverse reinforcement 18 consists of at least two layers of reinforcing material, i.e., where cells adjoin one another, thereby increasing the transverse strength of structure 100. This feature can be further enhanced simply by constructing cells such that reinforcing fabric 14 (or fibers if braiding techniques are used) overlaps at the portion of each core 12 that is to form transverse reinforcements 18 in structure 100. Thus, the present invention has great utility where combined loading can be expected, e.g., any crash situation.

For purpose of illustration, it is assumed that cores 12 are foam cores that remain a part of structure 100. However, cores 12 could also be removed from the structure as noted above. In either case, structure 100 (e.g., a beam as shown in FIG. 1C) can be engineered to be stable in a variety of directions yet crush in a single (desired) direction, e.g., along the axial direction. The various directions are represented by force arrows and are defined as follows. Structure 100 is configured with the assumption that the primary crush loads will occur along the longitudinal axis of each of cells 10. This axial or primary force is represented by arrow 201. The transverse load direction is defined by arrow 202, and a force experienced longitudinally with respect to structure 100 is represented by arrow 203. Various shear forces include the in-plane shear force 204 acting in the plane of structure 100 and transverse shear force 205.

In constructing structure 100, the longitudinal axes of the cells are aligned with primary crush force direction, e.g., the direction indicated by arrow 201. The fibers of fabric 12 and the fibers of skin 16 are thus generally oriented relative to the primary crush load direction to ensure out of plane stability, shear strength, bending stiffness, etc., to suit a particular application. For example, assuming axial force 201 represents the direction of the expected primary crush force, the fibers of fabric 12 could be oriented with respect to the axial direction in order to improve the shear stability of the structure. The fiber orientation of skins 16 can be oriented at angles with respect to the axial direction to, for example, regulate the crushing load.

Figure 2:
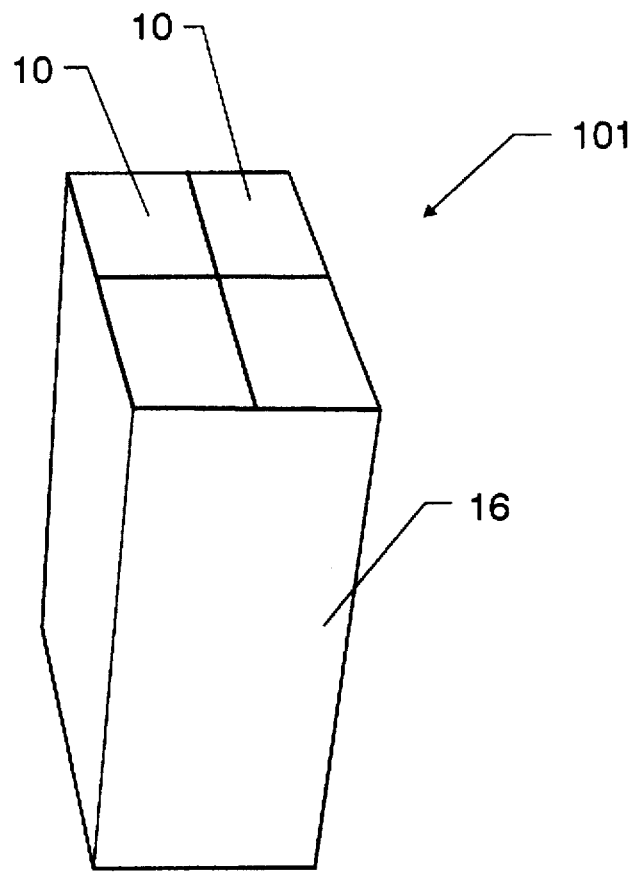
FIG. 2 is a perspective view of a column structure according to the present invention in which the cells are arranged in a two-dimensional configuration.

As mentioned above, the fabrication method and resulting structure are not limited to beam configurations. As shown in FIG. 2, cells 10 can be arranged in other geometric configurations to produce, for example, a column structure 101. Column structure 101 could be fabricated in the same fashion as described above.

Mass production of the present invention can be facilitated by using braiding techniques. In such an instance, a long length of the core material could have the core-reinforcing fibers braided therearound in continuous fashion. Then, the so wrapped core material could be cut into smaller pieces thereby forming a plurality of cells which can then be arranged/assembled into a structure as described above. To simplify the fabrication process even further, the containment skin could be braided over the assembled cells.

Figure 3:
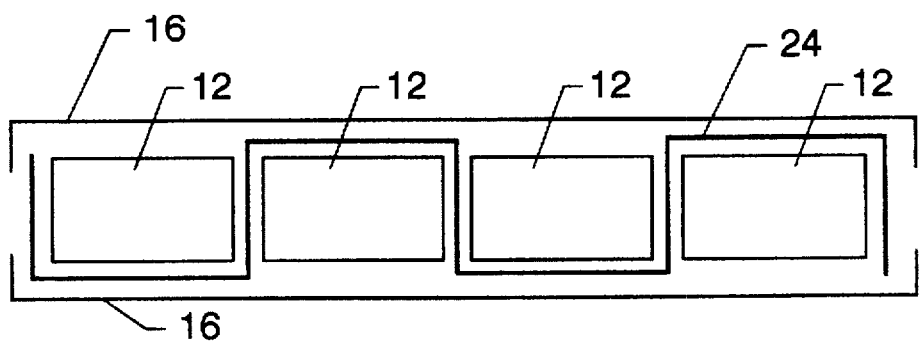
FIG. 3 is an exploded schematic view of an alternative fabrication approach in which a plurality of cores are wrapped in a square wave fashion with a single piece of reinforcing fiber fabric.

Multiple celled structures of the present invention could also be fabricated using a single piece of glass fabric. For example, as shown in FIG. 3, a single piece of glass fabric 24 could be wrapped about a plurality of cores 12 in a square wave fashion. The resulting arrangement of cells would then be wrapped with a containment skin as described above.

The advantages of the present invention are numerous. The composite structure is effective at managing crush energy while the fabrication method is a simple, affordable approach for assembling the structure. The cured structure is stable, can function on its own with no additional reinforcement and can withstand combined loading while crushing in the desired direction. Design and fabrication flexibility allows the present invention to be used for practically any crash-energy management situation that may occur in either moving or stationary structures. The use of composites also means that the present invention is ideal for use in environments that would be corrosive for metals.

Although the invention has been described relative to specific embodiments thereof, there are numerous other variations and modifications that will be readily apparent to those skilled in the art in light of the above teachings. For example, while the cores, cells and resulting structures described herein have been regularly shaped rectangles, beams and/or columns, this need not be the case. The cores could be any geometric shape such that, when arranged as cells to form a structure according to the present invention, adjoining cells will be in sufficient contact with one another to form the transverse reinforcements spanning substantially or completely between the containment skin(s). In addition, cells of various sizes and shapes could be combined to make an irregularly shaped structure.

Figure 4:
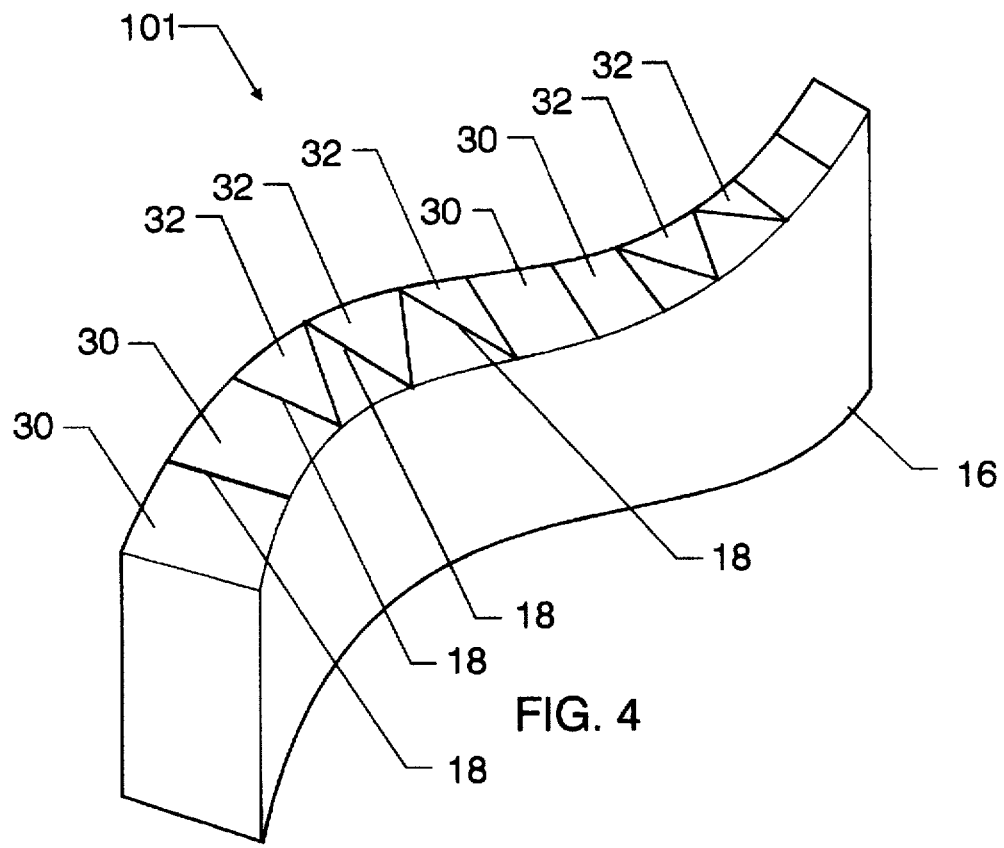
FIG. 4 is a perspective view of a shaped crash-energy absorbing beam according to the present invention.
Figure 5:
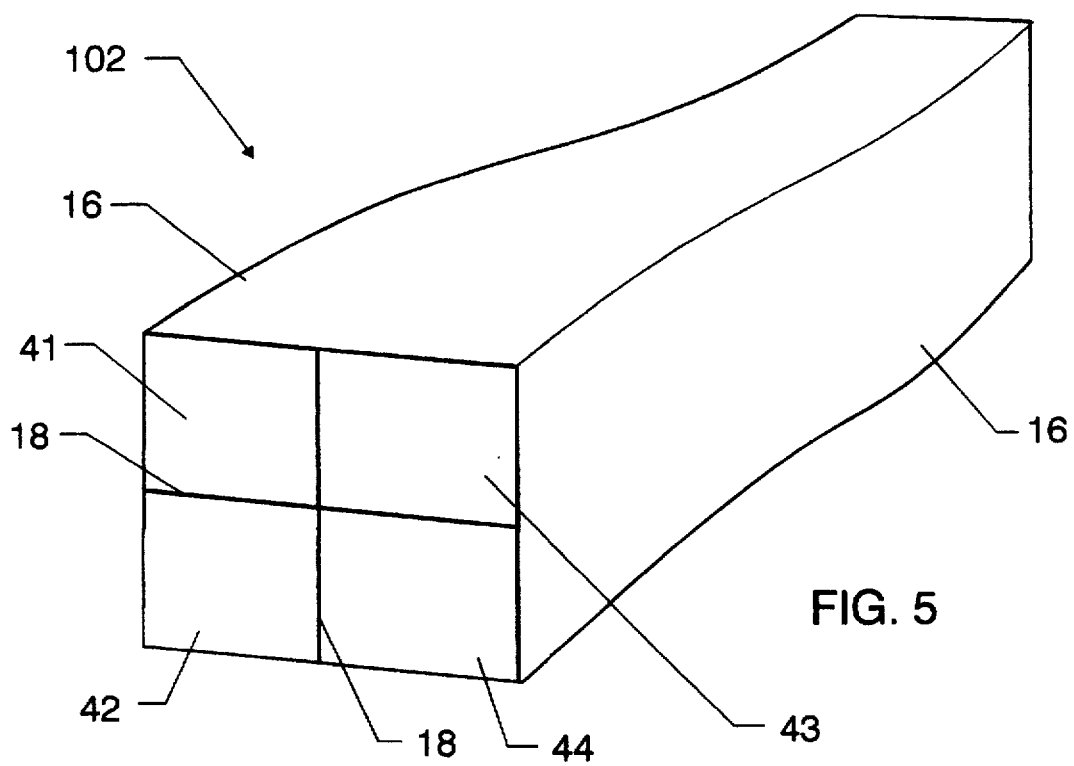
FIG. 5 is a perspective view of a shaped crash-energy absorbing column according to the present invention.

Two such irregularly shaped structures are shown in FIGS. 4 and 5. In FIG. 4, a resulting beam structure 101 is shaped for a particular application. Beam structure 101 is constructed from a combination of rectangular cells 30 and triangular cells 32. The cores for each cell could be cut from a single piece of core material that was shaped commensurate with the ultimate shape of structure 101. Each core could be prepared to form a cell (as described above) and the cells repositioned to once again form the shape of structure 101. Containment skin(s) 16 could then be applied as described above.

In FIG. 5, an irregularly shaped column structure 102 is shown. Structure 102 is constructed from cells 40, 41, 42, 43 that are irregularly shaped along the respective longitudinal axes. Once again, the cores for each cell could be cut from a single piece of core material. Each core could be prepared to form a cell and the cells repositioned to form the shape of structure 102. Containment skin(s) 16 could then be applied as described above. Note that structure 102 is formed such that transverse reinforcements 18 span between skin(s) 16.

It is therefore to be that, within the scope of the appended claims, the invention may be practiced other than as specifically described.

What is claimed as new and desired to be secured by Letters Patent of the United States is:

1. A crash-energy absorbing structure, comprising:
   a plurality of adjoining rigid cells, each of said plurality of adjoining rigid cells having a longitudinal axis and including resin-cured fibers wrapped continuously at least one time wholly about a perimeter thereof that surrounds said longitudinal axis, said plurality of adjoining rigid cells arranged in a geometric configuration; and
   a fabric of ductile fibers adhered to said geometric configuration of said plurality of adjoining rigid cells for maintaining said plurality of said adjoining rigid cells in said geometric configuration.

2. A crash-energy absorbing structure as in claim 1 wherein said geometric configuration comprises said plurality of adjoining rigid cells arranged such that each said longitudinal axis is parallel with one another.

3. A crash-energy absorbing structure as in claim 1 wherein said ductile fibers are selected from the group of aramid fibers, polyethylene fibers and combinations thereof.

4. A crash-energy absorbing structure as in claim 1 wherein each of said plurality of adjoining rigid cells is filled with a closed-cell structural foam.

5. A crash-energy absorbing structure as in claim 4 wherein said closed-cell structural foam is selected from the group consisting of polyvinyl chloride foam, polyurethane foam and polystyrene foam.

6. A crash-energy absorbing structure, comprising:
   a plurality of foam cores, each foam core having a longitudinal axis;
   a first plurality of fibers wrapped continuously at least one time wholly about each of said plurality of foam cores to surround said longitudinal axis wherein a corresponding plurality of cells are defined, said plurality of cells being arranged in a geometric configuration;
   a second plurality of fibers wrapped at least partially about said geometric configuration of said plurality of cells; and
   a cured resin material impregnated throughout said first plurality of fibers and said second plurality of fibers.

7. A crash-energy absorbing structure as in claim 6 wherein said geometric configuration comprises said plurality of cells arranged such that each said longitudinal axis is parallel with one another.

8. A crash-energy absorbing structure as in claim 6 wherein said second plurality of fibers are ductile fibers.

9. A crash-energy absorbing structure as in claim 8 wherein said ductile fibers are selected from the group of aramid fibers, polyethylene fibers and combinations thereof.

10. A crash-energy absorbing structure as in claim 6 wherein each of said plurality of foam cores is made from a rigid closed-cell foam.

11. A crash-energy absorbing structure as in claim 10 wherein said rigid closed-cell foam is selected from the group consisting of polyvinyl chloride foam, polyurethane foam and polystyrene foam.

12. A crash-energy absorbing structure, comprising:

a plurality of closed-cell foam cores;

a woven glass fiber fabric wrapped continuously at least one time wholly about a perimeter of each of said plurality of closed-cell foam cores to define a corresponding plurality of cells, each of said plurality of cells having a longitudinal axis about which said woven glass fiber fabric is surrounding, said plurality of cells arranged in a geometric configuration with each said longitudinal axis associated with each of said plurality of cells being parallel to one another;

woven ductile fibers wrapped at least partially about said geometric configuration of said plurality of cells for maintaining said geometric configuration; and a cured resin material impregnated throughout said woven glass fibers and said woven ductile fibers.

13. A crash-energy absorbing structure as in claim 12 wherein said woven ductile fibers are selected from the group of aramid fibers, polyethylene fibers and combinations thereof.

14. A crash-energy absorbing structure as in claim 12 wherein said closed-cell foam is selected from the group consisting of polyvinyl chloride foam, polyurethane foam and polystyrene foam.

15. A method of fabricating a crash-energy absorbing structure to receive a crush load from an expected direction, comprising the steps of:

providing a plurality of cores, each core having a longitudinal axis;

wrapping a first plurality of fibers at least one time wholly about each of said plurality of cores to surround said longitudinal axis thereof wherein a corresponding plurality of cells are defined;

arranging said plurality of cells in a geometric configuration such that each said longitudinal axis is parallel with one another;

wrapping a second plurality of fibers at least partially about said geometric configuration of said plurality of cells;

impregnating said first plurality of fibers and said second plurality of fibers with a resin material; and curing said geometric configuration so wrapped and impregnated to form said crash-energy absorbing structure, wherein said longitudinal axis for each of said plurality of cores is positioned parallel to said expected direction.

16. A method according to claim 15 further comprising the step of removing at least a portion of said plurality of cores after said step of curing.

* * * * *